(12) United States Patent
Kemeny

(10) Patent No.: US 7,817,562 B1
(45) Date of Patent: Oct. 19, 2010

(54) METHODS AND SYSTEMS FOR BACK END CHARACTERIZATION USING I/O SAMPLING

(75) Inventor: John N. Kemeny, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 874 days.

(21) Appl. No.: 11/537,202

(22) Filed: Sep. 29, 2006

(51) Int. Cl.
*H04L 12/26* (2006.01)
(52) U.S. Cl. ..................................... 370/241
(58) Field of Classification Search ................. 709/226; 370/241
See application file for complete search history.

(56) References Cited

U.S. PATENT DOCUMENTS

| | | | | |
|---|---|---|---|---|
| 6,078,990 | A * | 6/2000 | Frazier | 711/114 |
| 2002/0077836 | A1* | 6/2002 | Elnozahy et al. | 705/1 |
| 2004/0025162 | A1* | 2/2004 | Fisk | 718/105 |
| 2004/0210522 | A1* | 10/2004 | Bissantz et al. | 705/40 |
| 2007/0027985 | A1* | 2/2007 | Ramany et al. | 709/224 |
| 2007/0094393 | A1* | 4/2007 | Cochran et al. | 709/226 |
| 2007/0156879 | A1* | 7/2007 | Klein et al. | 709/223 |

OTHER PUBLICATIONS

Oliveira et al., U.S. Appl. No. 10/810,988, entitled "System and Method for Managing Storage Networks and Providing Virtualization of Resources in Such a Network," filed Mar. 26, 2004.

* cited by examiner

*Primary Examiner*—Derrick W Ferris
*Assistant Examiner*—Mang Yeung
(74) *Attorney, Agent, or Firm*—Daly, Crowley, Mofford & Durkee, LLP

(57) ABSTRACT

Disclosed methods and systems relate to characterizing a dynamic performance quality of service available from a storage element within a storage system. An exemplary method includes initiating a known I/O request to the storage element; measuring a time the storage element takes to respond to the known I/O request; and reporting a measure of the quality of service available from the storage element. One implementation of the method further includes using the time measurement and an estimation algorithm to calculate the quality of service and adjusting the load on the storage element based on the quality of service.

17 Claims, 5 Drawing Sheets

METHODS AND SYSTEMS FOR BACK END CHARACTERIZATION USING I/O SAMPLING

BACKGROUND

Often a user expects a certain quality of service from his data storage system and sets targets for this performance. A user generally chooses a storage system with static performance ratings showing that the storage system has the capability to meet performance targets. But a user may have little information about the quality of service of individual storage devices and/or storage systems within his data storage system. The user may also have little information about the present quality of service of individual storage devices as it compares to past performance or the static performance ratings.

In addition, the increased use of virtualization software makes the quality of service of individual storage devices and/or storage systems increasingly difficult to ascertain. In a virtualized storage system, the host application is presented with logical units of storage capacity that may be made up of one or more storage elements or portions thereof. Where virtualization is used, users are therefore insulated from knowledge of which storage elements they are using. Nonetheless, with or without virtualization, the quality of service provided by individual storage devices and/or storage systems affects the quality of service experienced by the user.

Known monitoring tools, such as performance monitors and application software optimizers, measure on-line system performance over a relatively long-term basis—typically hours, days, weeks, or months. These tools are thus able to identify system trends by comparing the system's measured performance to its past performance in a comparable performance period. Known monitoring tools rely on existing host traffic to measure system performance. Accordingly, it may be difficult to use the information available from known tools to determine the available capacity of a system for future use. Similarly, with known monitoring tools, performance data may be unavailable if the system has been idle. Although these tools can be used to monitor a system, they typically include no feedback mechanism that would enable a monitored system to be automatically adjusted.

The lack of information about the quality of service presently available from individual storage devices and/or storage systems can be detrimental to the optimal use of a user's storage system. Sometimes users may have prioritized tasks, but lack information that enables them to determine how a low priority task may affect higher priority tasks. For example, a user may schedule a back-up task to occur when trends indicate there will be available capacity to run the back-up task without affecting the quality of service for higher priority tasks. Similarly, a user may set a parameter such that a movement of data during a migration task runs at a low speed to avoid affecting the quality of service for higher priority tasks. Making these decisions based on trends or on static performance ratings may unnecessarily reduce the network's efficiency.

SUMMARY OF EXEMPLARY EMBODIMENTS

The inventor of the present invention recognized that a method for proactively characterizing the dynamic quality of service available from a storage element within a computer system could enable a user to increase the use of the storage element while maintaining an acceptable quality of service. The inventor recognized that present quality of service measurements may be preferable to trend analysis or static performance ratings of data storage elements when determining the impact of a future task to be performed using a storage element. The inventor recognized that such a method could enable a user to optimize the quality of service of a virtual storage system and could also be useful in a computer system without a virtualization system.

Methods and systems are disclosed that relate to characterizing the dynamic performance quality of service available from one of a plurality of storage elements in a storage system. One embodiment consistent with principles of the invention is a method that includes initiating a known input/output (I/O) request to a storage element within the storage system. The time the first storage element takes to respond to the known I/O request is measured and a measure of the dynamic performance quality of service available from the first storage element is reported.

Another embodiment consistent with principles of the invention is a method for characterizing a dynamic performance quality of service available from one of a plurality of storage elements in a virtualization system. The virtual storage system presents storage capacity of the plurality of storage elements to a host application as at least one logical unit. The method includes identifying a first storage element within the virtualization system. The method also includes initiating a known I/O request to a first storage element within the storage system, measuring a time the first storage element takes to respond to the known I/O request, and reporting a measure of the dynamic performance quality of service available from the first storage element.

Another embodiment consistent with principles of the invention is a system for characterizing the dynamic performance quality of service available from a plurality of storage elements within a virtual storage system. The system includes a memory and a processor coupled to the memory. The processor is also coupled, via a network, to a host and the plurality of storage elements. The memory stores metadata related to the first storage element. The processor is configured to manage the first storage element using the metadata and to present a storage capacity associated with the first storage element to a host application as at least a portion of a logical unit. The processor is also configured to implement a method for characterizing the dynamic performance quality of service available from the first storage element. The method includes initiating a known I/O request to the first storage element, measuring a time the first storage element takes to respond to the known I/O request, and reporting a measure of the dynamic performance quality of service available from the first storage element.

Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

The inventor of the present invention recognized that using existing I/O to gather performance trend information and the knowing the static performance ratings of a storage system may not be sufficient to gauge the performance available for future operations when a storage element is in use. Accordingly, the inventor devised a method for proactively characterizing the dynamic performance quality of service available from one of a plurality of storage elements.

In addition, the inventor of the present invention recognized that, while the use of a virtual layer in a computer system offers advantages, it also presents challenges to a user trying to manage his computer system to achieve or maintain a specific quality of service. In particular, virtualization hinders a user's ability to ascertain the quality of service available from individual storage elements in a virtual storage system. The inventor further recognized that information derived from this method can be used to make adjustments in the storage system and I/O requests to the storage system to maintain a specific target dynamic performance quality of service. Additionally, the inventor recognized that information derived from this method can be used to increase the usage of a storage system while maintaining a specific quality of service.

Dynamic performance quality of service, as used herein, may differ from the static quality of service identified in the specifications of a storage element. Examples of dynamic performance quality of service measures include I/O per second throughput and megabyte per second bandwidth for a given I/O type (I/O read or write and I/O size).

Reference is now made in detail to illustrative embodiments of the invention, examples of which are shown in the accompanying drawings. First, three computer systems including a virtualization system in which the invention may be implemented are described. Then, an implementation of the invention is described in detail. Although each of the exemplary illustrated computer systems include a virtualization system, the invention may be implemented in a computer system that does not include a virtualization system.

Figure 1:
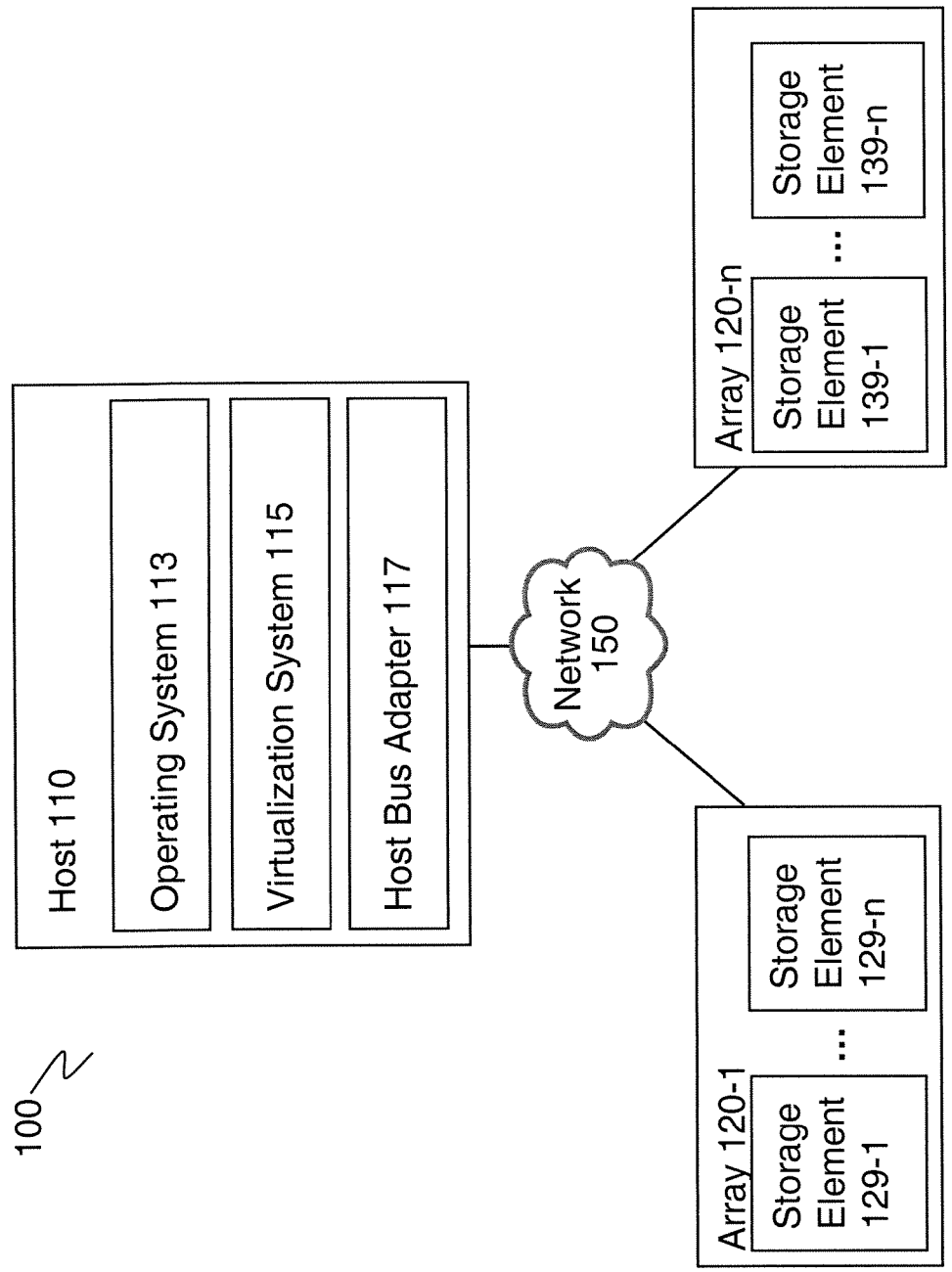
FIG. 1 illustrates an exemplary computer system including a virtualization system in the host consistent with features and principles of the present invention.

FIG. 1 illustrates an exemplary computer system 100 including a virtualization system 115. Computer system 100 includes at least one host 110 connected via a network 150 to at least one storage array. Host 110 can be a personal computer or a server. Network 150 enables communications between host 110 and each of the storage arrays 120-1 through 120-*n*. A storage element is any physical storage device such as a disk drive.

In FIG. 1, host 110 includes an operating system (OS) 113, an optional virtualization system 115, and at least one host bus adapter 117. The at least one host bus adapter 117 controls communication between host 110 and other components on network 150. The host bus adapter 117, for example, may be implemented as a Small Computer Systems Interface standard (SCSI) driver to interact with other SCSI drivers where network 150 includes a SCSI bus. Alternatively, network 150 can be implemented as a Fibre channel fabric. The available storage elements 129-1, . . . , 129-*n* and 139-1, . . . , 139-*n* service the I/O requests of applications running on host 110 via network 150.

If FIG. 1 did not include virtualization system 115 anywhere in computer system 100—storage elements 129-1, . . . , 129-*n* and 139-1, . . . , 139-*n* would be directly available to any host application running on OS 113. Accordingly, without a virtualization system, storage elements storage elements 129-1, . . . , 129-*n* and 139-1, . . . , 139-*n* are directly presented to any host application running on OS 113 as logical units.

In FIG. 1, however, virtualization system 115 on host 110 handles communication between the at least one host bus adapter 117 and any host application running on OS 113. When virtualization is implemented in host 110 or elsewhere in computer system 100, the virtualization system creates a layer of abstraction between the functionality of the available storage elements 129-1, . . . , 129-*n* and 139-1, . . . , 139-*n* and any host application running on OS 113. The virtualization system may create a layer of abstraction between at least one logical unit and the available storage elements 129-1, . . . , 129-*n* and 139-1, . . . , 139-*n* by aggregating, striping, and/or mapping the storage capacity of storage elements. Virtualization system 115, for example, presents the storage capacity of storage elements 129-1, . . . , 129-*n* and 139-1, . . . , 139-*n* to any host applications running on to OS 113 as at least one logical unit. The VERITAS virtualization system, available from Symantec Corporation of Cupertino, Calif., is an example of a virtualization system that can be implemented on a host. A logical unit presented to a host application may be made up of at least a portion of one or more available storage elements 129-1, . . . , 129-*n* and 139-1, . . . , 139-*n*, which may be from any storage array 120-1 through 120-*n*. Storage elements storage elements 129-1, . . . , 129-*n* and 139-1, . . . , 139-*n* are the back end of the storage system where there is virtualization.

Figure 2:
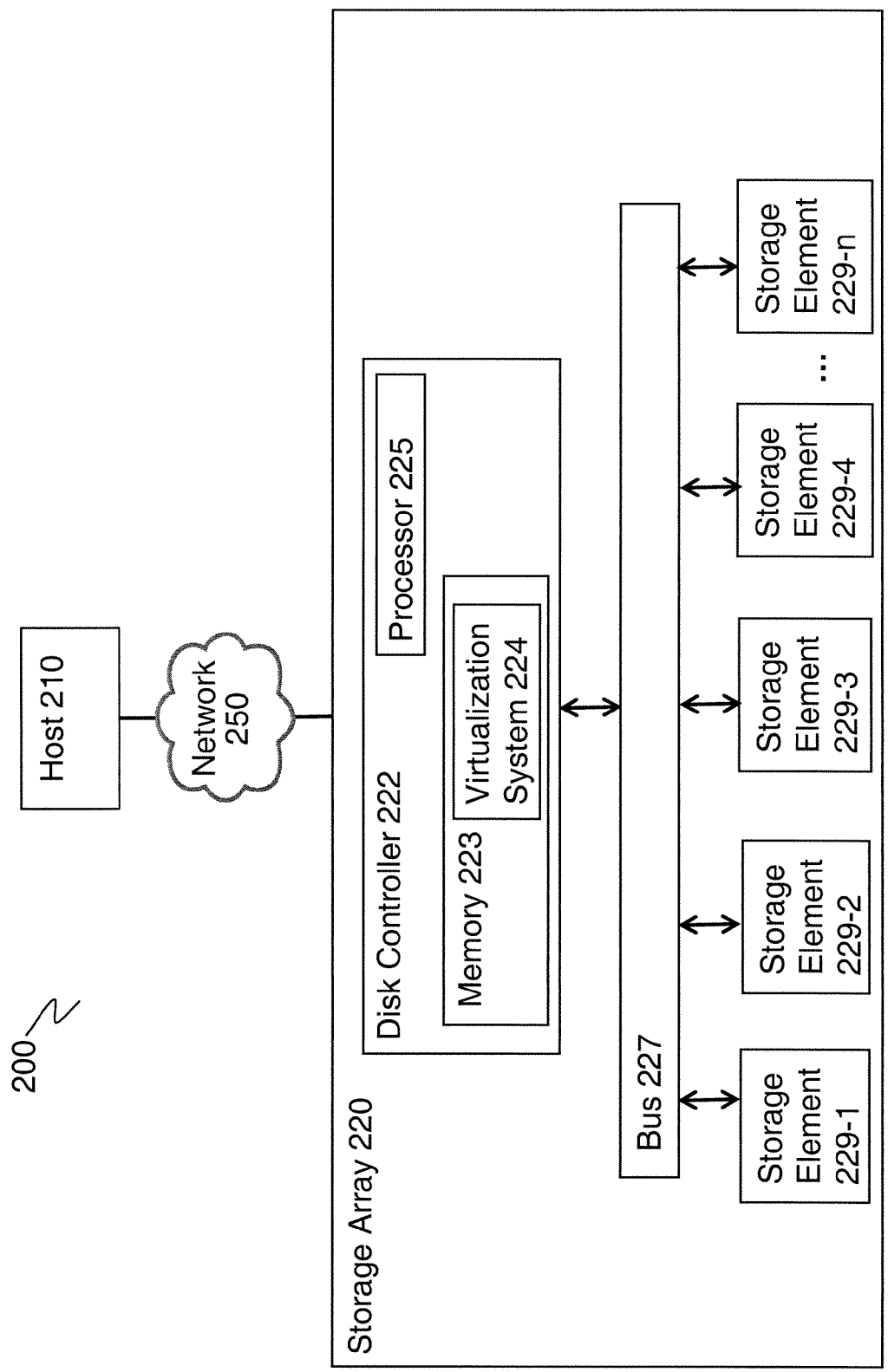
FIG. 2 illustrates another exemplary computer system including a virtual storage system in the data storage array consistent with features and principles of the present invention.

FIG. 2 illustrates another exemplary computer system 200. Like computer system 100, computer system 200 includes at least one host 210 connected via a network 250 to storage. Like storage array 120, storage array 220 contains one or more storage elements 229. Like network 150, network 250 enables communications between host 210 and storage. Unlike computer system 100, computer system 200 includes a virtualization system 224 in a storage array 220. Accordingly, storage elements 229 service the requests of applications running on host 210 via storage array 220. Storage array 220 in FIG. 2 could be, for example, a CLARIION, a FAStT, a TagmaStore, or a SYMMETRIX data storage system. Both CLARIION and SYMMETRIX data storage systems are available from EMC Corporation of Hopkinton, Mass. The FAStT and TagmaStore data storage systems are respectively available from IBM and HDS.

FIG. 2 also illustrates an exemplary storage array 220 in detail. Storage array 220 includes a plurality of storage elements 229-1 to 229-*n*, at least one storage bus 227, an at least one disk controller 222. Each disk controller 222 controls communication between storage array 220 and other components outside the storage array 220. Each disk controller 222 typically controls access to a plurality of storage elements 229. The disk controller 222 may be implemented as a SCSI driver to interact with other SCSI drivers where network 250 includes a SCSI bus. Alternatively, network 250 can be implemented as a fibre channel fabric. Disk controller 222 includes a processor 225, memory 223, and virtualization system 224. Virtualization system 224 presents logical units, made up of storage capacity from storage elements 229-1 to 229-n, to host 210 via disk controller 222 and network 250.

Figure 3:
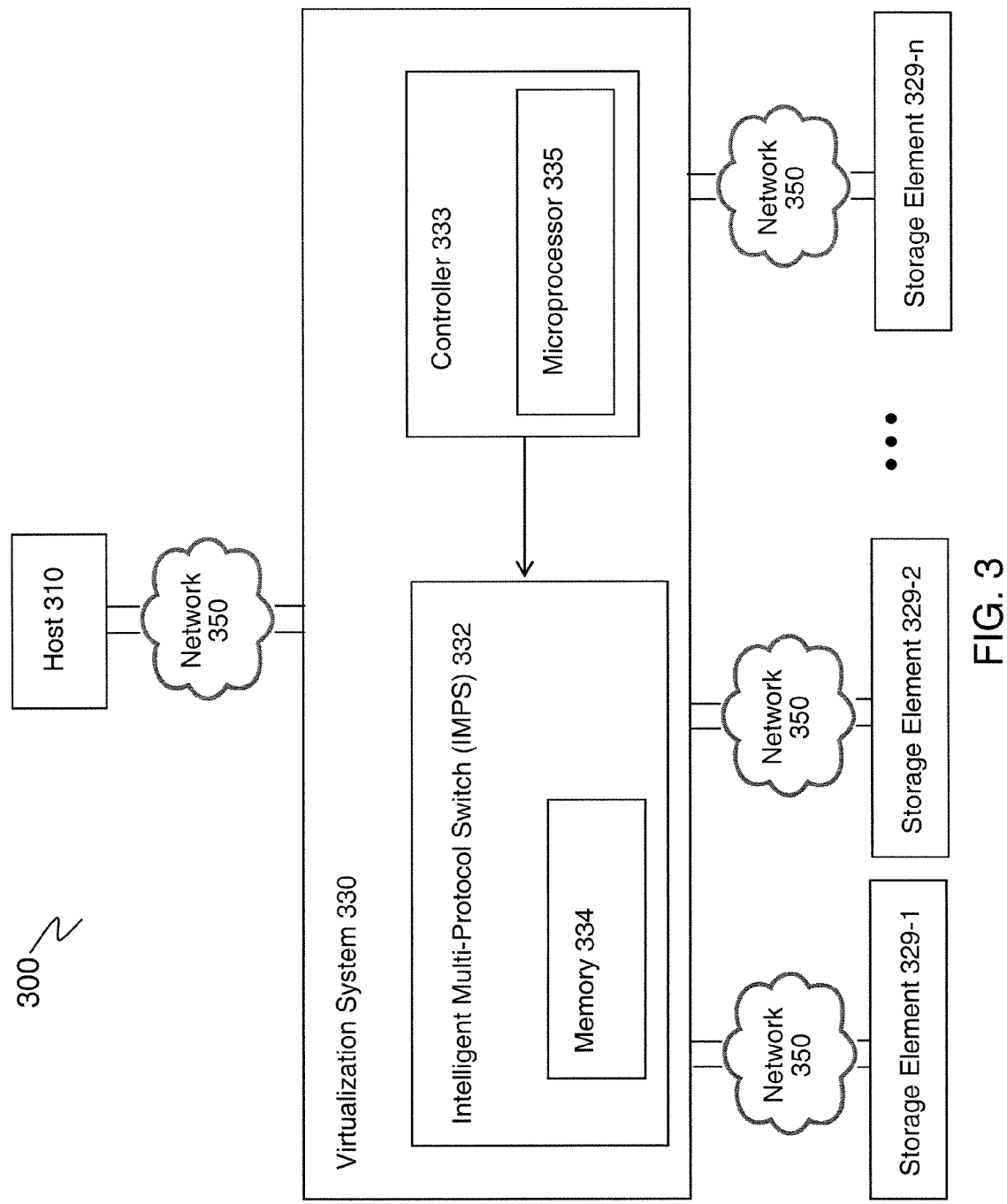
FIG. 3 illustrates another exemplary computer system including a virtual storage system consistent with features and principles of the present invention.

FIG. 3 illustrates a third exemplary computer system 300 including a virtualization system 330 implemented in hardware that acts as an intermediary between host 310 and storage. FIG. 3 includes at least one host 310 connected via a network 350 and a virtual storage system 330 to at least one storage element 339. In particular, FIG. 3 includes one host 310 and a plurality of storage elements 329-1, 329-2, ..., 329-n, which can be storage elements connected via network 350 to virtual storage system 330. The inclusion of virtualization system 330 between network 350 and storage devices 320 may enable centralized and/or simplified management of data on storage elements 329-1, 329-2, ..., 329-n. Other than virtualization system 330, each of the other elements of FIG. 3 may be the same as or similar to those illustrated in and described with respect to FIG. 1 and/or FIG. 2.

Unlike FIG. 3, the storage devices associated with a virtualization system in the network layer may be grouped together within an array. When a computer system is reconfigured to add a virtualization system in the network layer, such as virtualization system 330, an existing storage element or array can be imported into the virtual storage system and the storage element or array is then considered "encapsulated" by the virtual storage system.

In computer system 300, virtualization system 330 includes an intelligent multi-protocol switch (IMPS) 332 including memory 334 for storing metadata related to storage element 320 and any other data volume incorporated into computer system 300. Memory 334 can be any device for storing data, such as a disk array. Virtualization system 330 also includes a controller 326 including at least one processor 335. Processor 335 can be any device capable of processing information, such as a microprocessor or a digital signal processor. Controller 326 is configured to manage the storage elements 329-1, 329-2, ..., 329-n encapsulated by virtual storage system 330 using the metadata in memory 334 and IMPS 332.

Virtual storage system 330 can be, for example, the INVISTA application running on an IMPS, such as one of Cisco's MDS 9000 family of switches. EMC Corporation of Hopkinton, Mass. offers the INVISTA application. Virtual storage system 330 can be, for another example, a "Fabric_X Instance" such as described in U.S. patent application Ser. No. 10/810,988, entitled "System and Method for Managing Storage Networks and Providing Virtualization of Resources in Such a Network," filed on Mar. 26, 2004, the description of which is hereby incorporated by reference.

Although virtualization system 330 has no physical disk geometry, it presents geometry information to host 310. This feature enables virtualization system 330 to appear as one or more storage elements 329 to host 310. Together the virtualization system 330 and the encapsulated storage elements 329 can be considered a storage system in computer system 300. Virtualization system 330 presents logical units of storage capacity, made up of storage elements 329 or portions thereof, to the operating system and applications running on host 310. Storage elements 329 encapsulated by virtual storage system 330 are the back end of the storage system 330.

Figure 4:
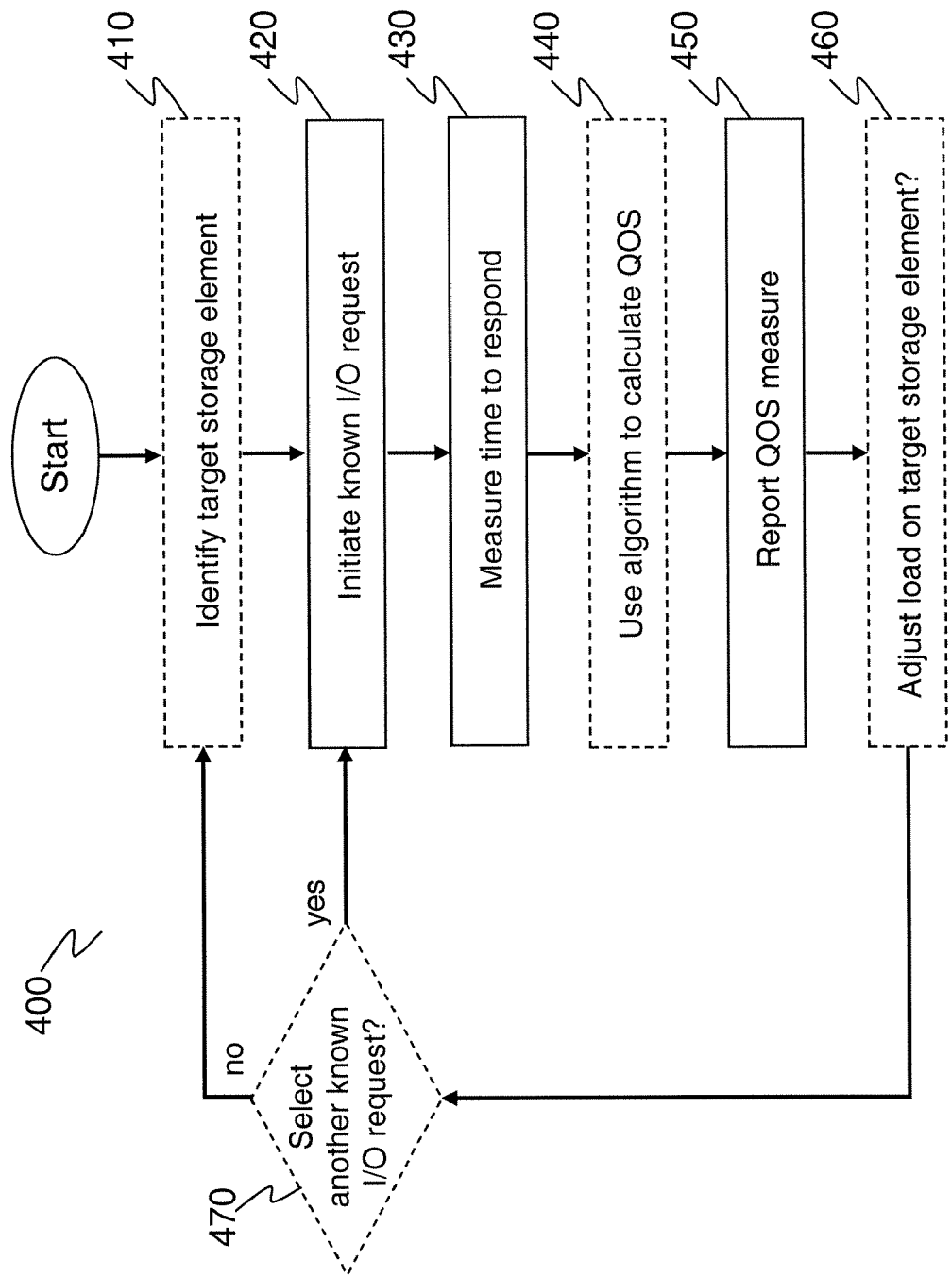
FIG. 4 illustrates an exemplary method for proactively characterizing a dynamic performance quality of service available from a storage element in a storage system.

FIG. 4 illustrates a method 400 for characterizing a dynamic performance quality of service available from a storage element in a computer system. Method 400 can be implemented, for example, in virtualization system 115 in computer system 100, virtualization system 224 in computer system 200, or virtualization system 330 of computer system 300. Method 400 can also be implemented a computer system without a virtual layer or a virtualization system. Method 400 includes three basic stages. In stage 420, a known I/O request to the target storage element is initiated. In stage 430, the time for the target storage element to respond to the known I/O request is measured. In stage 450, a measure of the quality of service available from the target storage element is reported.

When method 400 is used to characterize the dynamic performance quality of service available from a storage element in a computer system featuring a virtualization system, it may further include stage 410. In optional stage 410, a target storage element of interest is identified. The target storage element may differ each time method 400 is practiced. For example, where there are three storage elements in the storage system, stage 400 may target each of the three storage elements on a round robin basis. Such a scheme may be implemented to detect over or under utilized storage elements and flag them for possible data migration or other efficiency improvement initiatives. Alternatively, storage elements may be targeted on a demand basis. For example, if a user is wants to perform a task that would put a high demand on a particular storage element, he may first request a report of the quality of service available from that storage element. The user may thereby specify parameters for the task that are appropriate in view of the available quality of service. Still alternatively, storage elements may be targeted on a more specific basis. For example, low-performing storage elements may be targeted less frequently to minimize the increased load on these storage elements.

The size of the I/O request initiated in stage 420 can be selected for its known relationship to the measure of the quality of service available from the target storage element. Alternatively, the size of the initiated I/O requests can be selected to achieve the best estimation of quality of service for the next I/O request to be performed in the computer system. For example, before a data migration task is performed, a large I/O size may be selected for initiation in stage 420. Alternatively, for an application accessing small portions of memory frequently, a small I/O size may be selected for initiation in stage 420.

In stage 450, the reported measure of the quality of service available from the target storage element need not be the measured time for the target storage element to respond to the known I/O request. In optional stage 440, a measure of the quality of service available from the target storage element is calculated using the measured time and an estimation algorithm. Estimation algorithms can be developed by bench testing a storage element to ascertain a relationship between the time to respond to a known I/O request and a measure of a quality of service available from the storage element. Alternatively, the same relationship can be dynamically estimated from the series of previous sample I/O measurements.

Figure 5:
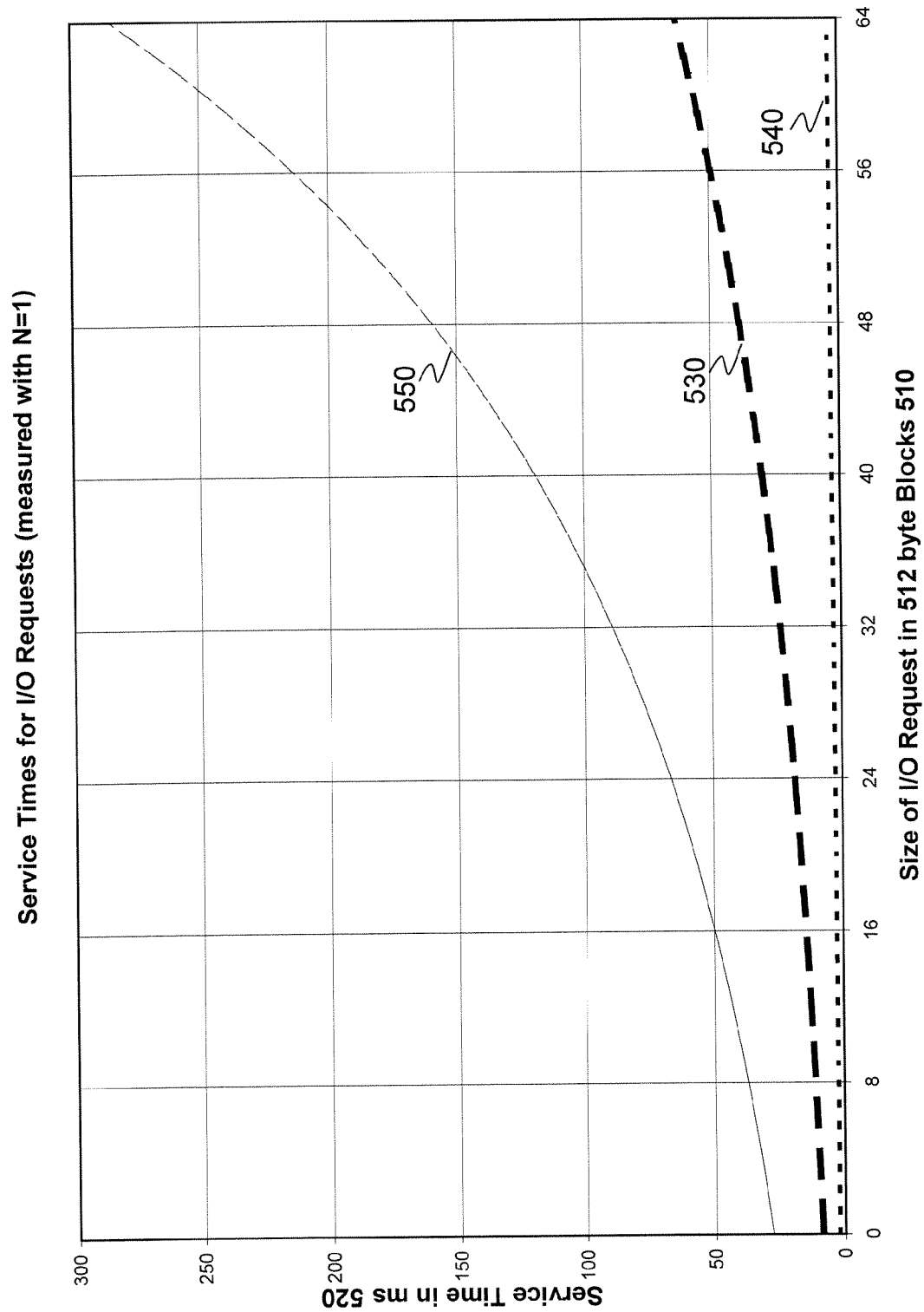
FIG. 5 illustrates a relationship, for a storage element, between a time to service an I/O request and types of I/O requests of various sizes.

FIG. 5 illustrates exemplary bench testing results from which estimation algorithms have been developed. FIG. 5 illustrates service times for a range of sizes of three different types of I/O requests with one outstanding I/O request per storage element (N=1). The I/O request sizes 510 on the horizontal axis of FIG. 5 range from 0 to 64 blocks where each block is 512 bytes. The service times 520 on the vertical axis of FIG. 5 range from 0 to 300 ms. Three exemplary curves 530, 540, 550 in FIG. 5 illustrate a mathematical fit to data for uncached reads, cached reads, and uncached writes respectively. Curve 530 illustrates a relationship between the size of an uncached read request and a service time, which can also be represented by the equation, where the curve fit measure $R^2=1.0$:

$$y=8.188e^{0.0308x}$$

Curve 540 illustrates a relationship between the size of a cached read request and a service time, which can also be represented by the equation, where the curve fit measure $R^2=1.0$:

$$y=2.3369e^{0.0069x}$$

Curve 550 illustrates a relationship between the size of an uncached request and a service time, which can also be represented by the equation, where the curve fit measure $R^2=0.9995$:

$$y=27.887e^{0.0363x}$$

The data that is the basis for each of the curves 530, 540, 550 illustrated in FIG. 5 was generated using various block sizes on an array with 240 storage elements, with an average of one outstanding I/Os per storage element. Data, such as that illustrated in FIG. 5, can be measured on an idle system. Alternatively, data can be collected from systems under varied conditions to create estimation algorithms.

Using a known relationship between the size of an I/O request and a service time with a known number of outstanding I/O requests, a service time for a smaller known I/O request can be used to predict the service time for a larger I/O request. For example, if exemplary curve 530 illustrates the relationship, the time to service a 16 block I/O request (approximately 50 ms) can be used to estimate the time to service a 32 block I/O request (approximately 50 ms). Thus, the time to respond to a smaller known I/O request can be measured in stage 430, and the measured time can be used to estimate the quality of service for a larger I/O request. The estimate may then be reported in stage 450.

In some embodiments of stage 440, the measure of the quality of service available from the target storage element is calculated from a plurality of measured times for the target storage element to respond to known I/O requests. In some such embodiments, a number of different sized known I/O requests can be used to calculate the quality of service available from a target storage element. In optional stage 470 of method 400, a second known I/O request is initiated. Stage 440 can use more than one measured response time to determine the quality of service available from the target storage element. For example, in one optional stage 440, a measure of the quality of service available from the target storage element is calculated using both measured times for the target storage element to respond to known I/O requests as input to an estimation algorithm. Additionally, stage 440 can use the last several measured response times for the target storage element. In that case, the number of measured response times used as input to the algorithm remains constant and each use of the algorithm includes the most recent measured response times for the target storage element as input. Moreover, a set of known I/O requests required to calculate quality of service for a single storage element can include I/O requests of different sizes. Finally, the set of known I/O requests required to calculate quality of service may differ for different storage elements.

In optional stage 460, a feedback mechanism is used to ensure the storage system maintains a desired level of service. Stage 470 can include comparing the calculated quality of service measure for the target storage element to a predetermined quality of service measure. The predetermined quality of service measure may be specified for the entire storage system or for one or more storage elements within the storage system. If the calculated value exceeds the predetermined value, the load on the target storage element can be adjusted to improve its available quality of service. Such load adjustment can include, for example, reducing the speed at which a plurality of low-priority I/O requests directed to the target storage element are executed or suspending these requests to achieve the predetermined quality of service for higher priority I/O requests. Alternatively, a load adjustment may include data migration, where data is moved from one storage element to another to maintain the desired quality of service level. The calculated quality of service measure may also be used to determine the speed at which this data is migrated to another storage element or the size of each portion of data to be moved.

The equations illustrated in FIG. 5 can be used as estimation algorithms to determine the reserve capacity of a target storage element. Results, such as those exemplified in FIG. 5, can be used in conjunction with the measured response time from stage 430 to find the I/Os per second reserve capacity of a storage element that is currently in use. Once determined, the reserve capacity reveals the additional use a storage element can handle while maintaining the target dynamic performance quality of service.

For example, in optional stage 460, virtualization system 115 could use algorithm and data illustrated in FIG. 5 to estimate the available capacity and adjust the load of I/O requests to that storage element to take advantage of all of the available capacity. Using computer system 100, a user may be interested in doing 8 KB uncached reads for a particular application running on OS 113. In this example, virtualization system 115 can initiate an 8 KB uncached read request in stage 420. In stage 430, the measured time may be the same as the service time for an 8 KB uncached read request in FIG. 5—0.010 seconds (10 ms). This measured time suggests that the storage element may have available capacity. Consequently, virtualization system 115 may check the average number of outstanding I/O requests (N) for the target storage element. If that number is less than 1.0 (N<1.0), virtualization system 115 can use Little's Law to calculate the available capacity. Little's Law, $N=X^*(R+Z)$, describes the relationship between the average number of outstanding I/O requests—N, the throughput—X, the service time—R, and the queue or think time—Z. Applying Little's Law to the data provided with respect to FIG. 5 (N=1.0, R=0.010 seconds, Z=0 seconds), the storage element's throughput capacity can be calculated as one hundred 8 kB I/O requests per second ($X=N/(R+Z)=1.0/(0.01+0.0)=100$). Then, applying Little's Law to the current storage element data (N=0.5, R=0.010 seconds, Z=0 seconds), the storage element's current throughput can be calculated as fifty 8 kB I/O requests per second ($X=N/(R+Z)=0.5/(0.01+0.0)=50$). The available capacity is the throughput capacity (data from FIG. 5) less the current throughput. Thus, in this example, the storage element has fifty 8 kB I/O requests per second in available storage capacity (100−50=50). Accordingly, in stage 460, virtualization system 115 may therefore enable a task to direct up to fifty 8 kB I/O requests per second to the target storage element without adversely affecting the quality of service provided by that storage element.

Similarly, if the calculated value falls below some margin of the predetermined value, the load on the target storage element can be adjusted to take advantage of the available capacity. The user can specify the relevant margin as part of his load balancing policy. Such load adjustment can include, for example, increasing the speed at which a plurality of low-priority I/O requests directed to the target storage element are executed. The present invention enables the load on a target storage device to be adjusted dynamically as the quality of service available from the target storage device changes.

In method 400, the initiation of a known I/O request to a target storage element can be triggered in a variety of ways. For example, a timer can trigger the initiation of an I/O request. Where there are a plurality of storage elements, there can be one timer for all of the storage elements. This frequency at which such a timer triggers the initiation of an I/O request can be adjusted based on the number of storage elements being sampled. Alternatively, where there are a plurality of storage elements, there can be a separate timer for each storage element. The frequency at which a timer triggers the initiation of an I/O can be selected by a user to prevent a noticeable impact on the quality of service available from one or more of the target storage elements. A higher frequency of I/O requests provides more information to the user, but also increases the traffic to the target storage element potentially decreasing the quality of service available from the target storage device. Similarly, a lower frequency of I/O requests provides less information to the user and less potential impact on the quality of service available from the target storage element. A user can choose different sampling frequencies for different storage elements. In one embodiment, I/O requests are initiated once every period where the period ranges between a half second to five seconds.

For another example, the initiation of an I/O request can be triggered on demand. A user may want to information to determine appropriate parameters for a high volume task such as a storage system backup. Accordingly, a user may request a measure of the quality of service available from one or more target storage devices. Thus, a user may trigger the initiation of one or more I/O requests.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method, comprising:
determining a quality of service for virtualized storage elements in a virtual storage system that provides abstraction of logical units and a plurality of storage elements for a host application, by:
initiating an I/O request to a first one of the plurality of storage elements within the virtual storage system;
measuring a time the first one of the plurality of storage elements takes to respond to the I/O request;
reporting a measure of the quality of service available from the first one of the plurality of storage elements;
using an estimation of a relationship of a service time and a size of an I/O request to determine a reserve capacity of the first one of the plurality of storage elements based on the time the first one of the plurality of storage elements takes to respond to the I/O request; and
using a known relationship between a size of an I/O request and a service time with a known number of outstanding I/O requests to predict a service time for a larger I/O request based on a service time for a smaller known I/O request.

2. The method according to claim 1, further including determining dynamic performance of a different one of the plurality of storage elements on a round robin basis to detect under utilized storage elements.

3. The method according to claim 1, further including estimating available capacity of the first one of the plurality of storage element for adjusting an I/O load of requests.

4. The method according to claim 1, further including determining an amount of I/O requests that can be handled by the first one of the plurality of storage elements without adversely affecting quality of service of the first one of the plurality of storage elements.

5. The method according to claim 1, further including selecting a frequency of triggering initiation of quality of service I/O requests to prevent quality of service from falling below a threshold for the first one of the plurality of storage elements.

6. The method of claim 1 wherein the reserve capacity is measured in I/O requests per unit of time and indicates an additional use the first one of the plurality of storage elements can handle while maintaining the quality of service.

7. A system, comprising:
a processor coupled to a memory having stored instructions to enable the system to:
determine a quality of service for virtualized storage elements in a virtual storage system that provides abstraction of logical units and a plurality of storage elements for a host application, by:
initiate an I/O request to a first one of the plurality of storage elements within the virtual storage system;
measure a time the first one of the plurality of storage elements takes to respond to the I/O request;
report a measure of the quality of service available from the first one of the plurality of storage elements;
use an estimation of a relationship of a service time and a size of an I/O request to determine a reserve capacity of the first one of the plurality of storage elements based on the time the first one of the plurality of storage elements takes to respond to the I/O request; and
use a known relationship between a size of an I/O request and a service time with a known number of outstanding I/O requests to predict a service time for a larger I/O request based on a service time for a smaller known I/O request.

8. The system according to claim 7, further including instructions for determining dynamic performance of a different one of the plurality of storage elements on a round robin basis to detect under utilized storage elements.

9. The system according to claim 7, further including instructions for estimating available capacity of the first one of the plurality of storage element for adjusting an I/O load of requests.

10. The system according to claim 7, further including instructions for determining an amount of I/O requests that can be handled by the first one of the plurality of storage elements without adversely affecting quality of service of the first one of the plurality of storage elements.

11. The system according to claim 7, further including instructions for selecting a frequency of triggering initiation of quality of service I/O requests to prevent quality of service from falling below a threshold for the first one of the plurality of storage elements.

12. The system of claim 7 wherein the reserve capacity is measured in I/O requests per unit of time and indicates an additional use the first one of the plurality of storage elements can handle while maintaining the quality of service.

13. An article, comprising:

a non-transitory computer readable medium having stored instructions that enable a machine to:

determine a quality of service for virtualized storage elements in a virtual storage system that provides abstraction of logical units and a plurality of storage elements for a host application, by:

initiate an I/O request to a first one of the plurality of storage elements within the virtual storage system;

measure a time the first one of the plurality of storage elements takes to respond to the I/O request;

report a measure of the quality of service available from the first one of the plurality of storage elements;

use an estimation of a relationship of a service time and a size of an I/O request to determine a reserve capacity of the first one of the plurality of storage elements based on the time the first one of the plurality of storage elements takes to respond to the I/O request; and use a known relationship between a size of an I/O request and a service time with a known number of outstanding I/O requests to predict a service time for a larger I/O request based on a service time for a smaller known I/O request.

14. The article according to claim 13, further including instructions for determining dynamic performance of a different one of the plurality of storage elements on a round robin basis to detect under utilized storage elements.

15. The article according to claim 13, further including instructions for estimating available capacity of the first one of the plurality of storage element for adjusting an I/O load of requests.

16. The system according to claim 13, further including instructions for determining an amount of I/O requests that can be handled by the first one of the plurality of storage elements without adversely affecting quality of service of the first one of the plurality of storage elements.

17. The system of claim 13 wherein the reserve capacity is measured in I/O requests per unit of time and indicates an additional use the first one of the plurality of storage elements can handle while maintaining the quality of service.

* * * * *